US009277249B2

(12) United States Patent
Guzman et al.

(10) Patent No.: US 9,277,249 B2
(45) Date of Patent: Mar. 1, 2016

(54) METHOD AND SYSTEM FOR PROVIDING ON-DEMAND AND PAY-PER-VIEW CONTENT THROUGH A HOSPITALITY SYSTEM

(75) Inventors: Jorge H. Guzman, Gaithersburg, MD (US); Richard B. Tatem, Middletown, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 13/557,111

(22) Filed: Jul. 24, 2012

(65) Prior Publication Data
US 2014/0033236 A1 Jan. 30, 2014

(51) Int. Cl.
H04N 7/16 (2011.01)
H04N 7/18 (2006.01)
H04N 21/214 (2011.01)
H04N 21/222 (2011.01)
H04N 21/2543 (2011.01)
H04N 21/472 (2011.01)

(52) U.S. Cl.
CPC ....... *H04N 21/2143* (2013.01); *H04N 21/2146* (2013.01); *H04N 21/2221* (2013.01); *H04N 21/25435* (2013.01); *H04N 21/47211* (2013.01); *H04N 21/47217* (2013.01)

(58) Field of Classification Search
CPC ................................................. H04N 21/2543
USPC ............................................................ 725/4
See application file for complete search history.

(56) References Cited

U.S. PATENT DOCUMENTS 5,701,152 A * 12/1997 Chen ................................. 725/4
5,760,819 A 6/1998 Sklar et al.
5,801,751 A 9/1998 Sklar et al.
5,973,722 A 10/1999 Wakai et al.
5,990,928 A 11/1999 Sklar et al.
6,064,724 A 5/2000 Kelly (Continued)

FOREIGN PATENT DOCUMENTS

EP 1233592 A2 8/2002
EP 1530339 5/2005

(Continued)

OTHER PUBLICATIONS

International Search Report and Written Opinion dated Dec. 16, 2013 in International Application No. PCT/US2013/051742 filed Jul. 23, 2013 by Jorge H. Guzman et al.

(Continued)

Primary Examiner — Robert Hance
Assistant Examiner — William J Kim

(57) ABSTRACT

A method and system for providing content to a receiving device from a local headend is set forth. The local headend communicates channel data for content stored at a video server to a receiving device, receives a selection of the channel data to form selected content from the receiving device and communicates content corresponding to the selection to the receiving device. The local headend stores a purchase record corresponding to the selection at the local headend, associates the purchase record with the receiving device within the local headend and communicates a request for a callback from the local headend to the receiving device. The receiving device communicates a callback signal from the receiving device to an external headend comprising purchase data corresponding to the purchase record.

23 Claims, 5 Drawing Sheets

(56) References Cited

U.S. PATENT DOCUMENTS

| | | | |
|---|---|---|---|
| 6,118,976 | A | 9/2000 | Arias et al. |
| 6,201,797 | B1 | 3/2001 | Leuca et al. |
| 6,208,307 | B1 | 3/2001 | Frisco et al. |
| 6,259,891 | B1 | 7/2001 | Allen |
| 6,442,385 | B1 | 8/2002 | Marko |
| 6,529,706 | B1 | 3/2003 | Mitchell |
| 6,622,307 | B1 | 9/2003 | Ho |
| 6,802,077 | B1 * | 10/2004 | Schlarb ......... 725/104 |
| 7,600,249 | B1 * | 10/2009 | Blevins ......... 725/78 |
| 7,904,924 | B1 | 3/2011 | de Heer |
| 7,925,216 | B2 | 4/2011 | Casavant et al. |
| 8,132,216 | B1 * | 3/2012 | Tatem ......... 725/78 |
| 8,813,117 | B1 | 8/2014 | Inskip, VI |
| 2002/0026645 | A1 * | 2/2002 | Son et al. ......... 725/117 |
| 2002/0072332 | A1 | 6/2002 | Chang et al. |
| 2002/0178451 | A1 | 11/2002 | Ficco |
| 2003/0186647 | A1 | 10/2003 | Ikeda |
| 2003/0208764 | A1 | 11/2003 | Galipeau et al. |
| 2003/0216120 | A1 | 11/2003 | Ceresoli et al. |
| 2004/0153767 | A1 | 8/2004 | Dolgonos |
| 2004/0250282 | A1 | 12/2004 | Bankers et al. |
| 2004/0261110 | A1 * | 12/2004 | Kolbeck et al. ......... 725/78 |
| 2005/0009466 | A1 | 1/2005 | Kamdar et al. |
| 2005/0028208 | A1 * | 2/2005 | Ellis et al. ......... 725/58 |
| 2005/0068915 | A1 | 3/2005 | Atad et al. |
| 2005/0124289 | A1 | 6/2005 | Coffin |
| 2005/0136975 | A1 | 6/2005 | Caspi et al. |
| 2005/0216941 | A1 | 9/2005 | Flanagan et al. |
| 2005/0282489 | A1 | 12/2005 | Kamdar et al. |
| 2006/0004948 | A1 | 1/2006 | Grace et al. |
| 2006/0075444 | A1 | 4/2006 | Dillen |
| 2006/0107295 | A1 | 5/2006 | Margis et al. |
| 2006/0128418 | A1 | 6/2006 | Quelle et al. |
| 2006/0154687 | A1 | 7/2006 | McDowell et al. |
| 2006/0166739 | A1 | 7/2006 | Lin |
| 2006/0194535 | A1 | 8/2006 | Houldsworth et al. |
| 2006/0240811 | A1 | 10/2006 | De Luca |
| 2006/0285508 | A1 | 12/2006 | Vermola et al. |
| 2006/0294205 | A1 | 12/2006 | Aaltonen et al. |
| 2007/0086364 | A1 * | 4/2007 | Ellis et al. ......... 370/258 |
| 2007/0155307 | A1 | 7/2007 | Ng et al. |
| 2008/0155613 | A1 | 6/2008 | Benya et al. |
| 2008/0184300 | A1 | 7/2008 | Macrae et al. |
| 2008/0199150 | A1 | 8/2008 | Candelore |
| 2009/0064262 | A1 * | 3/2009 | Lejeune ......... 725/131 |
| 2009/0228908 | A1 | 9/2009 | Margis et al. |
| 2009/0300729 | A1 | 12/2009 | Karaoguz et al. |
| 2009/0320058 | A1 * | 12/2009 | Wehmeyer et al. ......... 725/31 |
| 2010/0235528 | A1 | 9/2010 | Bocharov |
| 2011/0173345 | A1 | 7/2011 | Knox |
| 2011/0219063 | A1 | 9/2011 | Park |
| 2012/0254365 | A1 | 10/2012 | Adimatyam |
| 2013/0054728 | A1 | 2/2013 | Amir et al. |
| 2013/0091521 | A1 | 4/2013 | Phillips |
| 2014/0129618 | A1 | 5/2014 | Panje et al. |
| 2014/0282765 | A1 | 9/2014 | Casey |

FOREIGN PATENT DOCUMENTS

| | | |
|---|---|---|
| GB | 2387090 | 10/2003 |
| GB | 2407738 | 5/2005 |
| WO | 0143364 | 6/2001 |
| WO | 2004054226 A2 | 6/2004 |
| WO | WO 2011106601 A2 * | 9/2011 |

OTHER PUBLICATIONS

Non-final Office action dated Aug. 6, 2013 in U.S. Appl. No. 12/338,663, filed Dec. 18, 2008 by Jorge H. Guzman.

David, Leonard; "Stratospheric Platform Serves as Satellite"; Jul. 24, 2002; http://www.space.com/missionlaunches/skytower_020724.html.

Daimlerchrysler; "DaimlerChrysler It Cruiser Telematics Concept"; Internet citation; retrieved from the internet: URL:http://java.sun.com/products/consumer-embedded/automotive/whitepapers/ITCruiser-Whitepaper.pdf; Jan. 2001; pp. 1-11; XP002271676.

Bott, Ed; Siechert, Carl; Stinson, Craig; "Windows® 7 Inside Out, Deluxe Edition"; Jul. 15, 2011; Microsoft Press; XP055225325; ISBN: 978-0-7356-5692-5; Chapter "14. Sharing and Syncing Digital Media".

Wikipedia; "Home Theater Personal Computer"; Internet Article; Aug. 29 2014; Retrieved from the Internet: URL:https://de.wikipedia.org/w/index.php?title=Home_Theater_Personal_Computer&oldid=133532331 [retrieved on Nov. 3, 2015]; whole document.

Wikipedia; "Digital media player"; Internet Article; Sep. 11, 2014; XP055225260; Retrieved from the Internet: URL:https://en.wikipedia.org/w/index.php?title=Digital_media_player&oldid=625034161 [retrieved on Nov. 3, 2015]; whole document.

Wikipedia; "iTunes"; Internet Article; Aug. 19, 2014; XP055225746; Retrieved from the Internet: URL:https://en.wikipedia.org/w/index.php?title=ITunes&oldid=621917825 [retrieved on Nov. 4, 2015]; see in particular sections "Library sharing", "Library viewing" and "iTunes Store".

Wikipedia; "Smart TV"; Internet Article; Jul. 6, 2014; XP055225742; Retrieved from the Internet: URL:https://en.wikipedia.org/w/index.php?title=Smart_TV&oldid=615795558 [retrieved on Nov. 4, 2015]; whole document.

Wikipedia; "Media server"; Internet Article; Jun. 23, 2014; XP055225261; Retrieved from the Internet: URL:https://en.wikipedia.org/w/index.php?title=Media_server&oldid=614062595 [retrieved on Nov. 3, 2015]; whole document.

Carbou, Romain; Diaz, Michel; Exposito, Ernesto; Roman, Rodrigo; "Digital Home Networking"; Oct. 31, 2011; John Wiley & Sons; XP055225295; ISBN: 978-1-84821-321-0; section "4.2. Standards Used in the Home".

Remy, Jean-Gabriel; Letamendia, Charlotte; "Home Area Networks and IPTV"; May 31, 2011; John Wiley & Sons; XP055225308; ISBN: 978-1-84821-295-4; section "5.2. The Digital Leisure Network: UPNP/DLNA".

* cited by examiner

METHOD AND SYSTEM FOR PROVIDING ON-DEMAND AND PAY-PER-VIEW CONTENT THROUGH A HOSPITALITY SYSTEM

TECHNICAL FIELD

The present disclosure relates generally to television systems and, more particularly, a system for providing on-demand content through a hospitality system.

BACKGROUND

Satellite television has become increasingly popular due to the wide variety of programming available and the quality of service. Hospitality systems may offer various types of programming from cable systems or satellite systems to guests. Often times, the systems are provided without program guides or other amenities typically found in a home viewing experience.

Hotel owners and property managers are continually trying to provide a wide variety of services to guests to enhance their stay at the location. Pay-per-view and on-demand are typically provided in home-viewing cable and satellite systems. However, hotels using satellite systems do not offer such services.

SUMMARY OF THE DISCLOSURE

The present disclosure provides a system and method for providing pay-per-view content through a hospitality system.

In one aspect of the disclosure, a method includes communicating channel data for content stored at a video server to a receiving device, receiving a selection of the channel data to form selected content from the receiving device, communicating content corresponding to the selection to the receiving device, storing a purchase record corresponding to the selection at the local headend, associating the purchase record with the receiving device within the local headend, communicating a request for a callback from the local headend to the receiving device and communicating a callback signal from the receiving device to an external headend comprising purchase data corresponding to the purchase record.

In a further aspect of the disclosure, a system includes a receiving device and a local headend in communication with the receiving device. The local headend communicates channel data for content stored at a video server to a receiving device, receives a selection of the channel data to form selected content from the receiving device and communicates content corresponding to the selection to the receiving device. The local headend stores a purchase record corresponding to the selection at the local headend, associates the purchase record with the receiving device within the local headend and communicates a request for a callback from the local headend to the receiving device. The receiving device communicates a callback signal from the receiving device to an external headend comprising purchase data corresponding to the purchase record.

Other features of the present disclosure will become apparent when viewed in light of the detailed description of the preferred embodiment when taken in conjunction with the attached drawings and appended claims.

DETAILED DESCRIPTION

Figure 1:
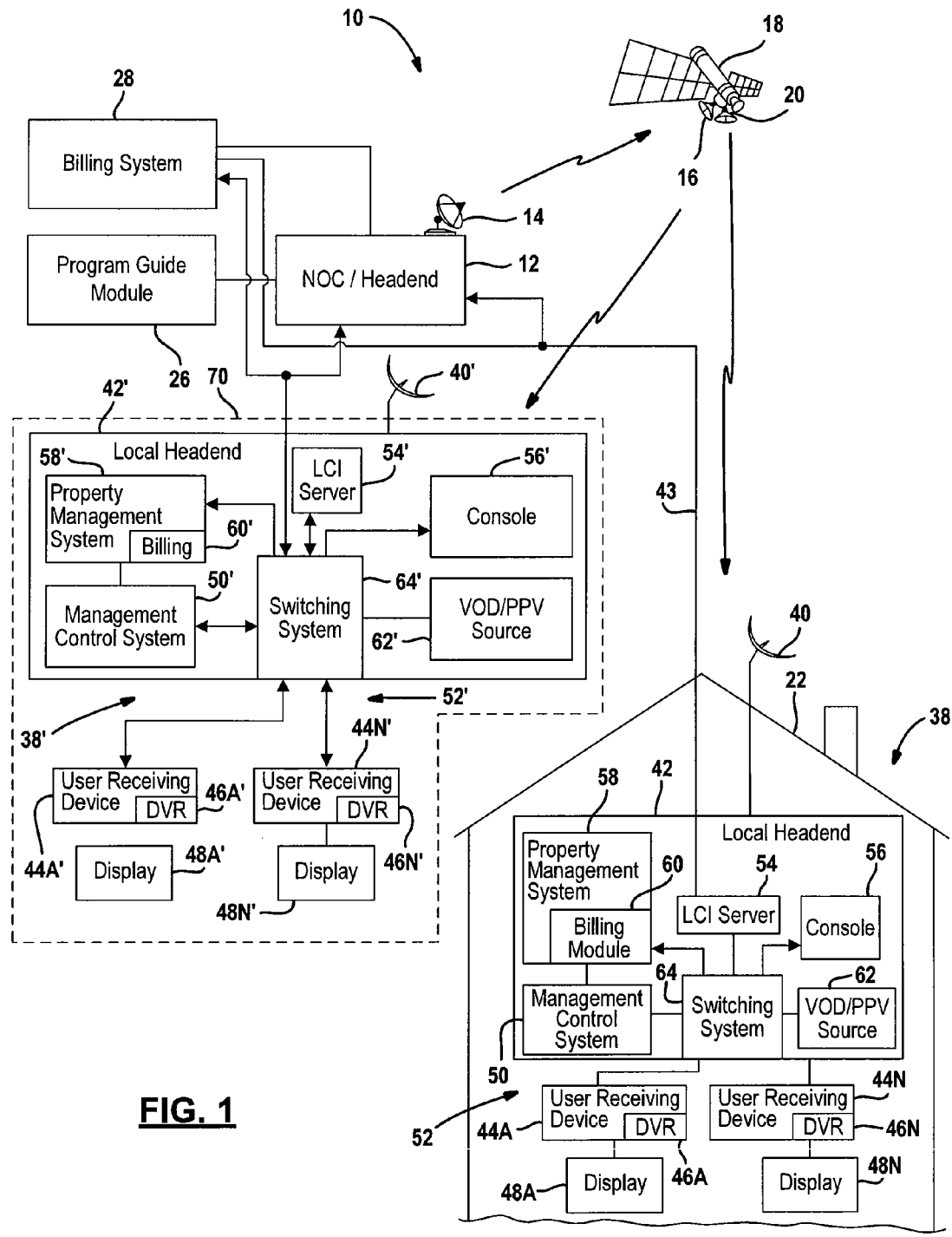
FIG. 1 is a block diagrammatic view of a content distribution system according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie. Insert detailed description.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Referring now to FIG. 1, a satellite television broadcasting system 10 is illustrated. The satellite television broadcasting system 10 includes an operational headend or network operations center (NOC) 12 that generates wireless uplink signals through a transmitting antenna 14 which are received by a receiving antenna 16 of a satellite 18. The wireless signals, for example, may be digital and in a first format used for satellite communications. A transmitting antenna 20 generates wireless downlink signals directed to various receiving systems including stationary systems such as those in a building 22 or property with multiple buildings. The building 22 may be a larger home, a multiple dwelling units, hotel or other types of commercial buildings in which having multiple screen displays coupled to a local server are desirable.

The wireless signals may have various types of data associated with them including various channel information such as a channel or program guide, metadata, location information and the like. A television channel communicated from outside the building or property will be referred to as an external channel. The guide data corresponding to the external channel is referred to as external guide data. Both the external guide data and external channel data may be received from the network operations center 12 or external headend 12. The wireless signals may also have various video and audio signals associated therewith.

The wireless signals may also include program guide data from a program guide module 26. The program guide module 26 may communicate various objects to the network operations center 12. Various types of data may be communicated about the programming and grid guide including the channel number, a network identifier, program data such as a start and end time of airing, title, numerical identifier, content data such as actors, descriptions, ratings and the like. Program guide data may include the relative positions of the data, the line structures for forming the grid for the program guide and the like. The program guide data may also include data corresponding to pay-per-view events. Pay-per-view (PPV) events are events that are broadcasted in a linear manner and may be tuned to for a fee. Pay-per-view events are broadcasted to each user simultaneously at a preset start time and end time. When a user purchases the pay-per-view session, encryption data is provided to a receiving device to decode the encrypted signal. The pay-per-view content is broadcasted on a single channel to a plurality of receiving devices at a predetermined start time.

The program guide data may also include video-on-demand (VOD) data. Video-on-demand content is program content that is provided to a user receiving device when requested. That is, on-demand content is not linear content in that the start time and end time are pre-established or scheduled. The start time and end time are based upon the request time and thus various users may request the same content starting and ending at different times. On-demand content may be for a fee or free. Both on-demand and pay-per-view content may be provided free for the first few minutes as a preview.

Content may also be on-demand but originate from PPV. That is, a local server may store PPV content therein and provide it to customers within the local area network on-demand.

A billing system 28 may also be associated with the network operation center or headend 12. The billing system 28 may provide billing for various operations within the building 22. In this example, the billing system 28 may provide a bill to the operators of the building 22 for various activity within the building including pay-per-view viewing and video-on-demand viewing as well as other periodic service charges.

Building 22 includes an aggregated content distribution system 38 for distributing both local content and external content. The local content may include both local channels for providing guest information as well as local channels used for on-demand content. The aggregated content distribution system 38 includes a receiving antenna 40 that receives the wireless signals from the satellite 18 and processes the signals in a local headend 42. The local headend 42 is within the property or building 22. The local headend 42 is physically separated from the external headend 12 by some transmission medium such as the satellite, cable or another wired, wireless network or combination thereof. In this example, a satellite and terrestrial network 43 are used. The terrestrial network may be a phone, cable, wired or wireless network. Although only one antenna 40 is illustrated more antennas may be provided.

The local headend 42 provides communication signals to a plurality of user receiving devices 44A-44N. The plurality of user receiving devices 44A-44N may be referred to as a set top box or integrated receiver decoder. In a hotel environment the set top box may be desired to be hidden from view. In such a situation, the set top box may be hidden behind the television and out of sight of the customers. Such a box may be referred to as a setback box. The set top box or setback box circuitry may be incorporated into the display circuitry. With the exception of the pass through signals described below, the setback box and set top box may be functionally equivalent. Unless otherwise stated, the term user receiving device is interchangeable with a set top box unless otherwise stated.

Each user receiving device 44A-44N may include an optional digital video recorder (DVR) 46A-46N. The digital video recorders 46A-46N may include a user partition and a network partition. This is illustrated below. The user partition is memory space that is set aside for the use of recording programming thereon. The network partition may include various controls, guide data and other data that may be provided to the set top box that is not under the control of the user or customer. As will be described below, the user partition may be reset or erased when a customer checks out from the building when the building is a hotel. Parental controls may also be erased or reset. Parental controls allow content above a rating to be restricted or not viewed at the user receiving device.

The plurality of user receiving devices 44A-44N receives signals from the local headend 42 and controls a respective display device 48A-48N in response to thereto. The display devices 48A-48N may include either an audio or a video display, or both. The display devices 48A-48N may be monitors or television displays. The display devices 48A-48N are individually controlled by their respective user receiving devices 44A-44N.

As was mentioned above, the system 38 may also apply to a cable-based or terrestrial wireless system. In such a case, the antenna 40 would be replaced with a cable connection or terrestrial antenna. The system 38 may also be used in a terrestrial broadcast system. In such a case, the satellite antenna 40 would be replaced by a terrestrial signal receiving antenna.

The local headend 42 includes a management control system 50 that performs many functions. The management control system 50 maintains a database with data about the user-receiving devices 44A-44N in a local network 52 that is in communication with the local headend 42. The management control system 50 also provides a server-based web application to manage the user receiving devices within the local network 52.

The management control system 50 also performs other functions including maintaining a channel list for the local content insertion channels, pay-per-view channel and VOD channel numbers. The channel or program metadata such as title, description, actors, review, etc. may also be included in the channel list. As mentioned above, the local headend may provide on-demand content for content stored within the local headend for which special channels are allocated for delivery. The details of the management control system will be set forth further in FIG. 3.

The local headend 42 may also include a local content insertion (LCI) server 54 that provides and manages the local content files, the generation of channel information, the sending of channel information to the user receiving devices 44A-44N and multicasting the local content via the network 52.

A console 56 may also be included within the local headend 42. The console 56 may be a web-based computer that accesses the various server applications provided within the local headend 42. A system operator may control the various functions of the local headend 42 including but not limited to system settings, channel adjustments and allocations for local channel PPV channels and VOD channels.

A property management system 58 may also be included within the local headend 42. The property management system 58 manages various functions including check-ins and check-outs. Also, accounting, bookkeeping, occupancy reports and the like may also be provided from the property management system 58. The property management system 58 may interface with various systems to perform functions such as pay-per-view and video on-demand record retrieval, hotel headend status, room use and the like. The property management system 58 and the management control system 50 may be in direct communication.

The property management system 58 may also include a billing module 60. The billing module 60 may keep track of various purchases and expenses associated with each property area, room or user. The billing system, for example, keeps track of the room charges, taxes, resort fees, pay-per-view and on-demand expenses. The billing module 60 may be a standalone module or incorporated within the property management system 58 as illustrated in the present example. The billing module 60 also determines whether a check-out has occurred. The billing module 60 may indicate a check-out using a check-out signal that is communicated within the property management system 58 and externally as will be described below.

The local headend 42 may also include a video-on-demand source 62. The video-on-demand source 62 may provide a source for both video-on-demand content and pay-per-view content. The video-on-demand source 62 may be responsible for receiving and storing video-on-demand files within the local headend 42 as will be further described below. The video source 62 may also be responsible for establishing and allocating channels for video-on-demand and pay-per-view content within the local headend. The video source 62 may also obtain metadata.

Each of the components 50-62 may also be in communication with a switching system 64. The switching system 64 may act as a routing system between the various components of the local headend and between the various components of the local headend 42 and the user receiving devices 44A-44N. The switching system 64 is illustrated as within the headend 42. However, the switching system 64 may be at least partially outside the local headend 42. The various functions of the components within the local headend 42 will be described in detail below.

An aggregated content distribution system 38' may also be disposed within a vehicle 70. The system 38' may also include an antenna 40', local headend 42' and a plurality of user receiving devices 44A'-44N' coupled to the local headend 42' through a network 52'. The vehicle 70 may be different types of vehicles including an airplane, ship, train, bus, van or automobile. Each of the user receiving devices 44A'-44N' may be coupled to a respective display device 48A'-48N'. As described above, each of the user receiving devices 44A'-44N' may also include a digital video recorder 46A'-46N', respectively. Also, the components of the local headend (50'-60') may also be similarly disposed for controlling and providing content to the various user receiving devices 44A'-44N'.

Figure 2:
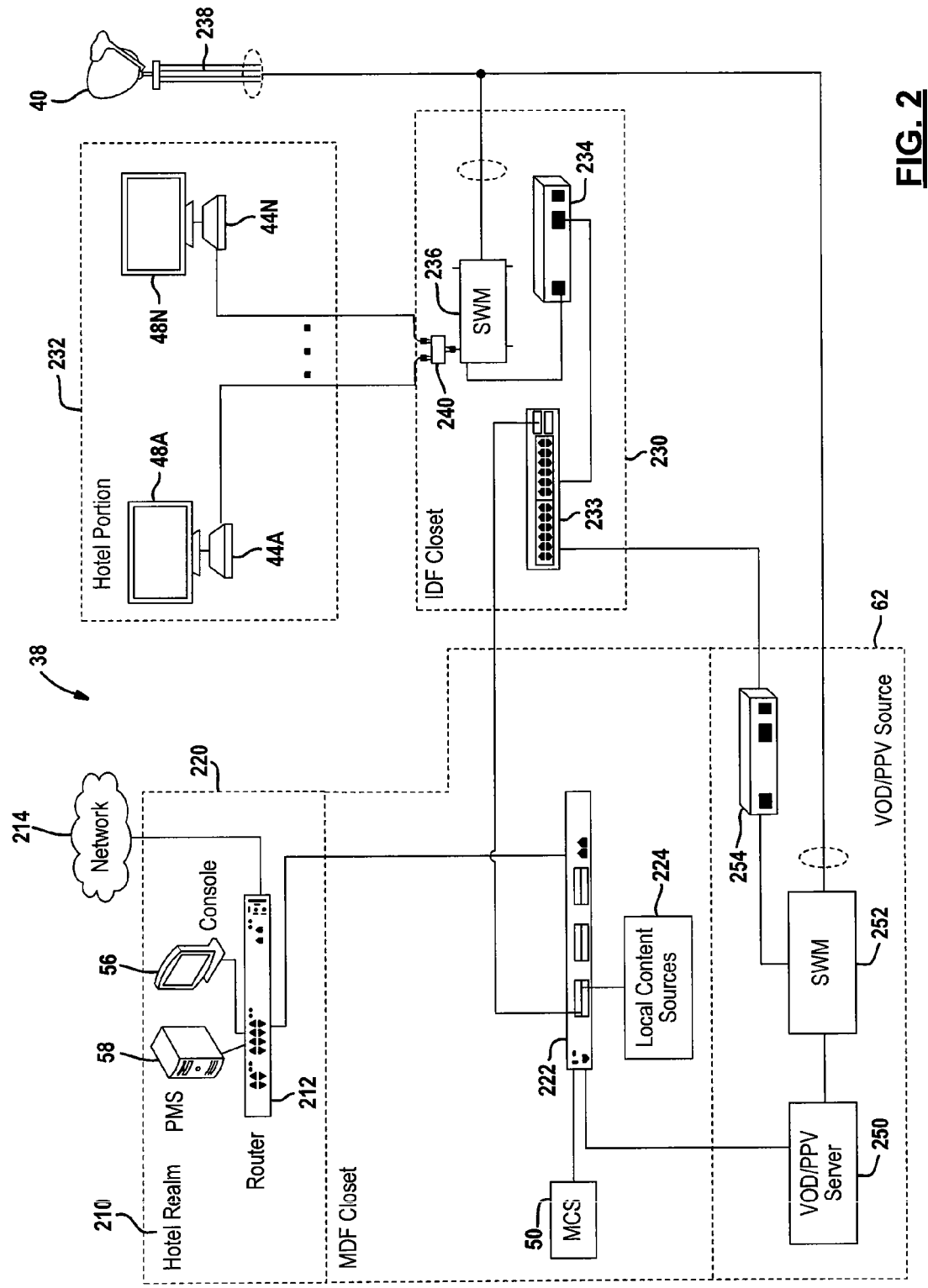
FIG. 2 is a simplified block diagrammatic view of a local content distribution system.

Referring now to FIG. 2, one example of the aggregated content distribution system 38 (or 38') is set forth for distributing local content, local pay-per-view and local video-on-demand content. The local aggregated content distribution system 38 also distributes external content received from the external headend 12. The local content distribution system 38 is illustrated segmented into different functional areas. In this example, a property (or hotel in this example) control portion 210 includes a router 212, the console 56 and a property management system 58. The router 212 may be part of the switching system 64 illustrated in FIG. 1. The router 212 may also be in communication with a network 214 for receiving and transmitting various data.

A main distribution facility (MDF) 220 may also be part of the aggregated content distribution system 38. The main distribution facility 220 may be in communication with and physically separated from the hotel control portion 210. The main distribution facility 220 may be located in a closet or room, for example, in a basement or in an out-of-the-way location. The main distribution facility 220 may include a main distribution facility switch 222. The main distribution facility switch 222 may also be in communication with local content sources 224. The local content sources 224 will be described below as different means for providing local content signals to the remaining portions of the system. The management control system 50 may also be in communication with switch 222.

The aggregated content distribution facility 38 may also include an intermediate distribution facility (IDF) 230. The intermediate distribution facility 230 communicates the content to various user receiving devices such as user receiving devices 44A-44N located within hotel rooms 232. The intermediate distribution facility 230 may be located on each floor of the hotel or adjacent to the plurality of hotel rooms in which it serves. For larger systems 38 one main distribution facility 220 and a plurality of intermediate distribution facilities 230 may be used. The intermediate distribution facility 230 may include an intermediate distribution facility switch 233 which communicates signals to a format conversion module 234. The format conversion module 234 is used to convert internet protocol (IP) signals to a coaxial format. In this example, the conversion module 234 may be a DIRECTV® Ethernet coaxial adapter (DECA). The conversion module 234 is an IP-to-coaxial converter. The conversion module 234 is in communication with a single wire multi-switch or switch module (SWM) which is referred to as a switch module 236. The switch module 236 may also be in communication with the antenna 40. In this embodiment, four outputs 238 are received from the antenna and communicated to the switch module 236. A splitter 240 may be used to split the output of the switch module 236 to communicate the content signals and guide data signals to the various areas such as hotel rooms 232 in this example.

The VOD/PPV source 62 is in communication with the intermediate distribution facility switch 233. In another embodiment, the VOD/PPV source 62 may be in communication with the main distribution facility switch 222.

The VOD/PPV source 62 may include a VOD/PPV content server 250. The VOD/PPV content server 250 is used for storing and distributing video-on-demand and pay-per-view content. The VOD/PPV content server 250 may include memory for storing the pay-per-view and video-on-demand content.

The VOD/PPV source 62 may also include a switch module 252. The switch module 252 may be a single-wire multi-switch module. The VOD/PPV server 250 together with the switch module 252 may be used to form a plurality of channels with various content including video-on-demand content and pay-per-view content.

The switch module 252 may be in communication with a conversion module 254. The conversion module 254 may be a DIRECTV® Ethernet coaxial adapter (DECA). The conversion module may be an IP-to-coaxial converter.

Figure 3:
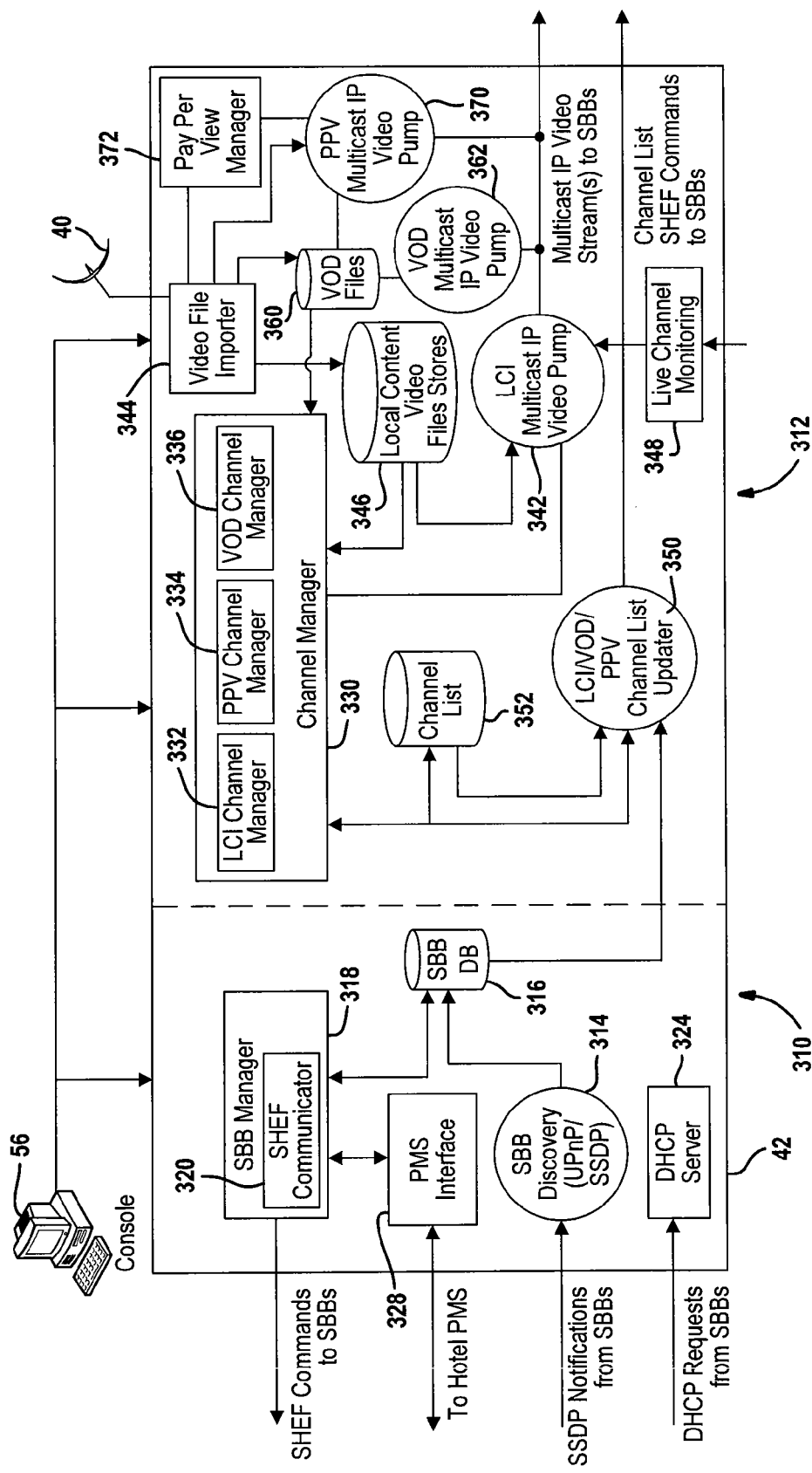
FIG. 3 is a block diagrammatic representation of the flow of content in the local headend.

Referring now to FIG. 3, the local headend 42 is illustrated in functional blocks that may be implemented in hardware, software or a combination of both. The local headend 42 has two main functions including user receiving device functions 310 and local content functions 312 such as local content insertion, pay-per-view insertions and video-on-demand insertion. The user receiving device functions 310 will be described as setback box functions but apply equally to various types of user receiving devices including a set top box.

The user receiving device functions 310 include a setback box discovery service 314. The setback box discovery service 314 initiates a service that listens to the local network to discover all the setback boxes on the network. The service may be implemented using different protocols including universal plug-and-play (UPnP) and simple service discovery protocol (SSDP). Upon discovery of a new setback box, the discovery service 314 reads identification data such as the IP address, the receiver identifier and the conditional access module information. Also, other types of data may be sent by the setback box discovery device including the signal quality, the current setback box time, and low battery status for the remote control. This data is stored within the setback box database 316. Each setback box may periodically notify the network of its presence. An "alive" status may also be communicated regularly by the setback boxes throughout the network. The setback box discovery service 314 receives the data which may be used by the setback box manager 318 to display availability information to the system operator.

The setback box database 316 contains lists for all discovered user receiving devices (setback boxes), a running status of the user receiving devices, a favorites list for each user receiving device and group data for the system.

The setback box manager 318 may include a set top box (STB) hypertext transfer protocol (HTTP) exported functionality (SHEF) communicator 320. The HTTP commands from the SHEF communicator 320 and as control commands to command the various user devices to perform different functions. The SHEF communicator 320 is a service that the setback box manager 318 uses to generate appropriate SHEF commands. The SHEF communicator 320 is capable of simultaneously communicating with a group or sub-group of setback boxes in order to quickly and efficiently send and receive data from a large number of setback boxes. The groups or sub-groups may be selected at the console 56 of the local headend.

The SHEF communicator 320 may use a SHEF encryption key to communicate with each setback box in the system. It should be noted that although one SHEF communicator 320 is illustrated, different numbers of physical machines may be used to run the function of the SHEF communicator 320. The number of physical machines is dependent upon the number of user devices. The SHEF communicator 320 initiates connections and prevents a second command from being sent to a setback box before a first command completes.

The setback box manager 318 allows the property management user to configure, manage and view the status of the various setback boxes within the system 38. This is performed using the console 56 illustrated in FIG. 3. All of the setback boxes for the system may be displayed at the console 56 with various data including a name, an IP address, a receiver ID, a status, whether or not the system is active, and the like. The display may also be organized by floors or other designated groups. Thus, different groups of setback boxes may be controlled in a different manner. The setback boxes may have access to different content or local channels as will be further described below. The setback box manager 318 may be used to set room numbers, reboot the setback boxes, display on-screen displays for a particular setback box or a group of setback boxes, and define, apply and reset default settings. The setback box manager 318 may also be used to define, manage and set favorites lists, receive visual or audio alerts regarding setback box changes from active to non-active, configure various screen alerts and the like.

The setback box manager 318 may also provide other functions including grouping of setback boxes into groups. This may be performed based upon room number. Groups may be assigned by selection for special groups or sub-groups at the facility. For example, when a conference is at a hotel, setback boxes for the rooms assigned to the attendees of the conference may be selected together. By selecting the group, local content channels may be accessed by only the attendees of the conference. For example, various lectures may be telecast through the local property. Another use is a concierge floor of a hotel which may allow access to more channels than a general guest. The groupings may also be assigned by floor.

The user receiving device functions 310 may also include a dynamic host configuration protocol (DHCP) server 324. The DHCP server 324 may be used to provide IP addresses to the setback boxes and used to receive requests from setback boxes using the dynamic host configuration protocol.

A property management system (PMS) interface 328 may also be included within a user receiving device functions 310. The PMS interface 328 allows the setback box manager 318 to communicate with the property management system 58 illustrated in FIG. 1. The property management system 58 may send event signals such as check-in or check-out signals. One purpose of the PMS interface 328 is to interface with an existing Property Management System with the local head-end. The PMS 85 may initiate resetting the defaults of the setback boxes in the rooms when a guest checks in or out by interfacing with the local head-end and sending these commands. A check-out or check-in signal may be received from the property management system which may then be communicated to the management control system 50. The PMS interface 328 is in communication with the setback box manager 318 which generates the appropriate communication signal such as the SHEF commands which are communicated to the setback boxes.

The local content functions 312 are used for generating program guide channel objects for the local content channels, pay-per-view channels and video-on-demand inserted at the local headend. The channel objects provide the setback boxes with enough data to create an entry in the program guide in the setback box. The channel objects also provide enough data to allow the setback boxes to tune to the proper local channel. It should be noted that a standard program guide may be received in various manners from the satellite. The channel objects for the local channels may be referred to as a local channel insertion channel object. The program guide is thus modified from a standard program guide for the local content distribution system.

The local content functions 312 include a channel manager 330. The channel manager 330 is used to define the channels that are communicated via a server-based web application. The channels may be managed by a web user interface from the console 56. Local content is distributed via a multicast stream having a multicast address on an IP network. Each multicast stream is defined by a channel which will appear in the setback box guide. Tuning data for the multicast stream is included in the program guide to allow the user devices to tune to the channel. Virtual tuning may be used to "join" a multicast using a multicast IP address. Metadata may also be provided for the local content and the live channel streams. The channel manager may store metadata for local channels.

The channel manager 330 may be used for performing various functions. A local channel insertion channel manager 332 may be used to insert a channel that is generated locally at the property. This channel may include locally-generated videos, camera feeds, and the like. The channel manager 330 may also include a pay-per-view channel manager 334. The pay-per-view channel manager 334 is used to generate pay-per-view channels within the local content distribution system for distributing pay-per-view content. A video-on-demand channel manager 336 is used to generate video-on-demand channels at the local content distribution system.

The local content functions 312 are used to manage the list of all available channels of local content using the channel manager 330. The local content functions 312 may also provide the ability to stream out any local content insertion stored video files via a multicast IP stream using a local multicast IP video pump 342.

A video file importer 344 may be used to import files via a file transfer protocol or USB. The video file importer 344 stores files in a video files store 346. The video file importer 344 imports content that is stored or prerecorded. The local content insertion functions 312 may also import content from live channels. A live channel monitoring system 348 may be provided prior to the multicast IP video pump 342. Live channels may be communicated to the multicast IP video pump 342 from the live channel monitoring system 348. The live channel monitoring system 348 may allow a check to be performed on the live channel so that "bad" content may not be distributed to the setback boxes. Live channel monitoring may include monitoring bitstreams for the live channels for validation. Checks may be a simple MPEG-2 transport packet synch-byte verification or looking for the presence of a particular bitstream. Of course, other types of monitoring, depending on the type of signal, may be performed.

A channel list updater 350 may be used to update a channel list 352 in response to the channel manager 330. The channel manager 330 may initiate an additional channel (channel insertion) or remove a local content insertion channel from the system (channel deletion). The local content insertion channel list updater 350 generates an insertion or deletion signal to update the channel list to add or remove a channel and direct the system to the proper content within the file store 346 or the live channels from the live channel monitoring system 348. These operations may be performed through the console 56. The channel list updater 350 may also be used for updating a list of video-on-demand content as well as pay-per-view channels available within the content distribution system. Pay-per-view channels may be live channels provided directly from a service provider such as DIRECTV®. Pay-per-view channels may also be generated directly within the local content distribution system from programming received from DIRECTV® or another video source.

The video file importer 344 may be used to import video-on-demand files which are stored within the storage device 360. The video-on-demand files may be stored and retrieved upon demand or selection from a user-receiving device. The video-on-demand content may be streamed to the user devices using the video-on-demand multicast IP video pump 362.

The video file importer 344 may also be used to receive pay-per-view programming. As mentioned above, pay-per-view programming has a fixed start time and end time. This may be locally established at the particular property from video-on-demand files or PPV files previously stored within the storage device 360 or from content streams provided directly from a service provider or external headend. The pay-per-view multicast IP video pump 370 may be used to provide pay-per-view channels and pay-per-view content to the user-receiving devices.

The local content functions 312 may also include a pay-per-view manager 372. The pay-per-view manager 372 may generate a purchase record of content purchased by a particular receiving device after a preview time has expired if applicable. Content owners often provide a free grace period such as five minutes before billing is incurred. A purchase record may be generated after the grace period. The purchase record may include purchase data such as the time, content title, channel and receiver identifier associated with the purchased content. The pay-per-view manager 372 reports the purchase to the property management system. The property management system 58 may report a checkout signal to the pay-per-view manager 372. The pay-per-view manager 372 may communicate a request to force a callback to the specific receiving device associated with the user account being checked out. The forced callback signal from the receiving device may be communicated directly to the external headend or indirectly to the external headend through the local headend. This allows the external headend to receive purchase data and store the purchase record for the local headend. Ultimately, a billing record is generated at the local headend. The billing record may be communicated electronically or through a paper copy to the owner of the local headend for payment.

The pay-per-view manager may also provide conditional access signals to the user devices so that the on-demand and pay-per-view channels can be withheld. The conditional access may include, but is not limited to, encryption keys/decryption keys.

Figure 4:
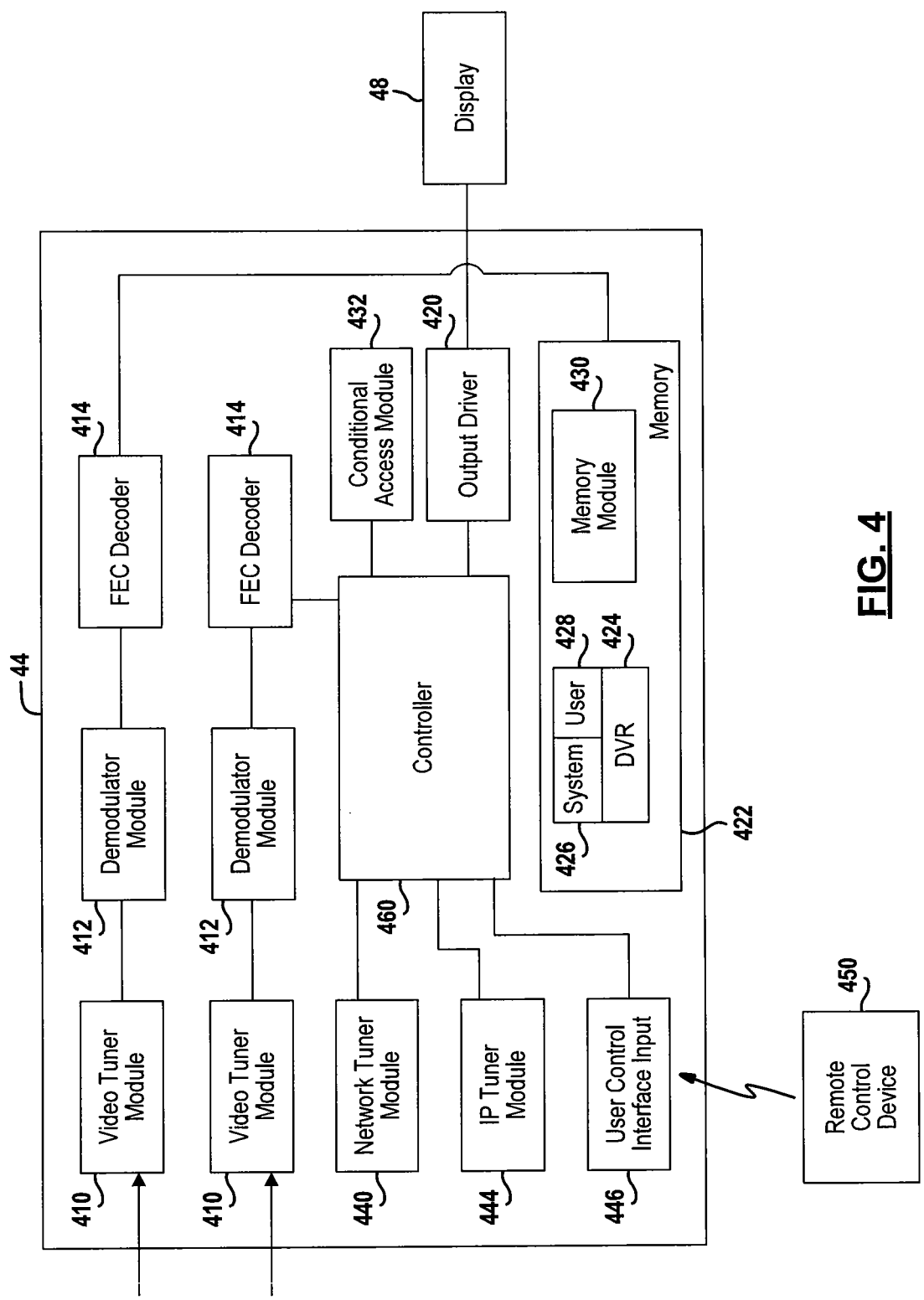
FIG. 4 is a block diagrammatic view of the user receiving device according to the present disclosure.

Referring now to FIG. 4, a user receiving device 44 is set forth in further detail. The user receiving device 44 may include one or more video tuner modules 410. The video tuner modules 410 may receive signals from the satellite antenna 40 through the single-wire multi-switch module 236. Each video tuner module 410 may be in communication with a demodulator module 412. The demodulator module 412 demodulates the tuned signal from the video tuner module and provides the output to a forward error correction decoder 414. The forward error correction decoder 414 may be provided to the display 48 through an output driver 420. Further, the output of one of the decoders 414 may be provided to a memory 422 which may include a DVR 424. As mentioned above, the DVR 424 may include a system partition 426 and a user partition 428. The content from the forward error correction decoder 414 may be stored in the user partition 428 for later playback.

A conditional access module (CAM) 432 may also be provided within the user receiving device. The CAM 432 may include decryption keys for decrypting the content received. The CAM 432 may receive signals from the local headend 42 for decrypting local PPV or on-demand content. Without a CAM 432 signals may not be used by the user receiving device 44.

The memory 422 may also include a memory module 430 that comprises various types of memory used for operating the user receiving device. For example, the memory module 432 may include volatile memory and non-volatile memory. Non-volatile memory may include an EEPROM. The memory module 432 may be used for storing various operational values and program guide data and the like.

The user receiving device 44 may also include a network tuner module 440. The network tuner module 440 may be used to tune to an RF signal for receiving program guide data. The program guide data may be received from an external source such as the satellite or through the local headend and the local content insertion functions 312 illustrated in FIG. 3. Guide data for local channels may be IP-based and received through the IP tuner module.

The user receiving device 44 may also include an IP tuner module 444. The IP tuner module 444 may be used to transmit and receive data through the local IP network associated with the content distribution system of the local headend.

The user receiving device 44 may also include a user control interface input 446. The user control interface input 446 may provide inputs from buttons or switches on a remote control device 450. For a setback box, the user control interface input 446 may be provided from the remote control device 450. For a set top box, the remote control device may communicate coded signals directly to the user control interface input using infrared or RF signals. The remote control device 450 may provide user control interface signals through a television for a user receiving device 44. The user control interface input 446 receives the coded signals from the remote control device and provides the coded signal to a controller 460. The controller 460 is a microprocessor-based system that controls the various components within the user receiving device 44. For example, the tuner module 410, the demodulator module 412, the decoder module 414, the conditional access module 430, the output driver 420, the memory 422 and the tuner modules 410 may all be associated or in communication with the controller 460. Based upon the various conditions, the controller 460 generates various outputs including displaying program guide data and content data as well as receiving and forming selections. Forming selections may include selecting a PPV channel or on-demand content and following the prompts for paying for or agreeing to pay for the content on checkout. The controller 460 also interfaces with the local headend 42 through the network tuner module 440 so that various functions may be controlled. Some functions have been described above and further functions will be described below.

It should be noted that the setback box or set top box embodied in the user receiving device 44 may not include all of the various components depending upon the configurations. Further, the number of other components may be increased as well. For example, the number of tuner modules 410, demodulator modules 412 and decoders 414 may be increased. Further, the requirement for an IP tuner module 444 or network tuner module 440 may not exist in some configurations. Various configurations for different types of systems using different types of communication protocols may require different components.

Figure 5:
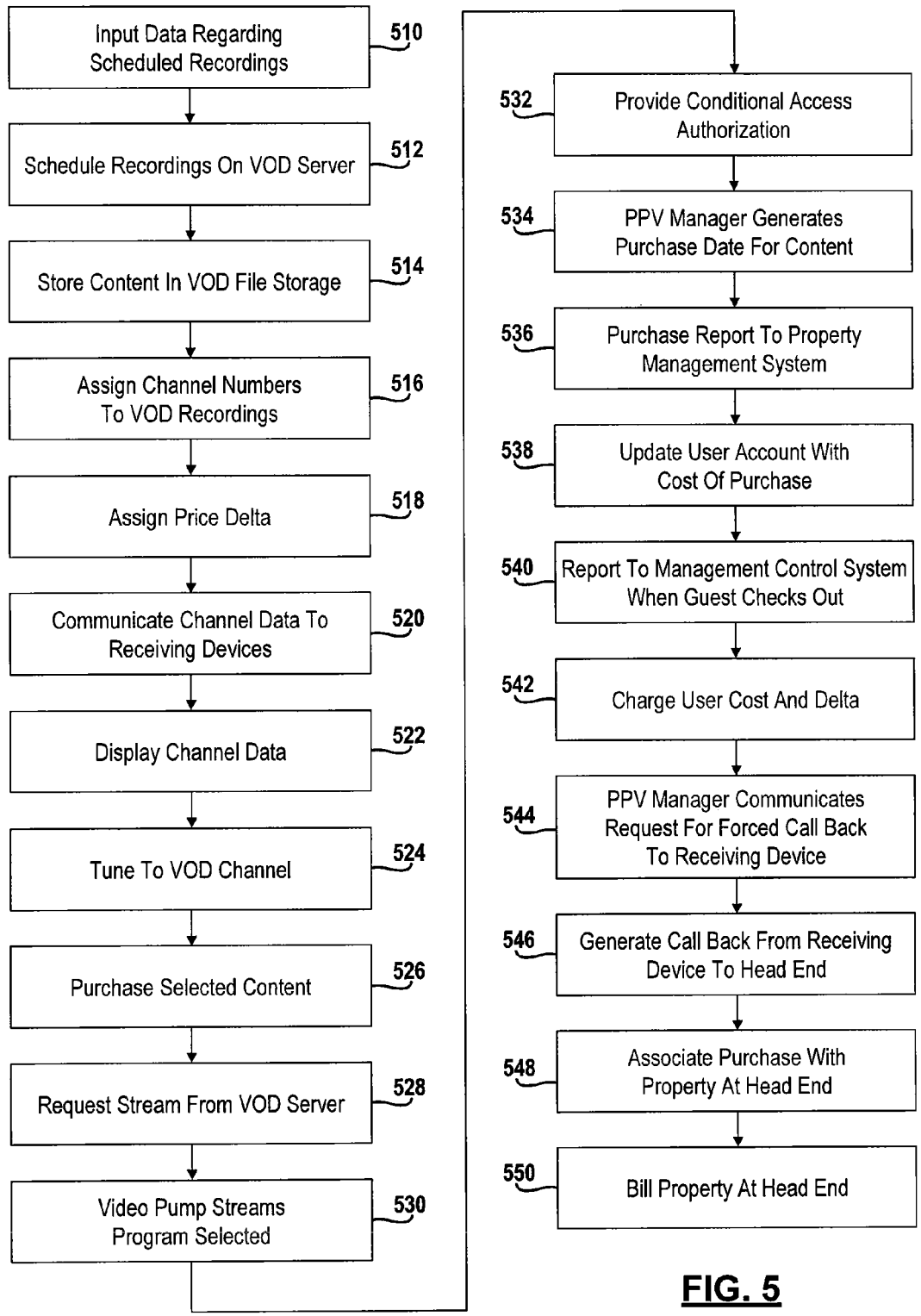
FIG. 5 is a flowchart of a method for receiving and distributing pay-per-view and on-demand content.

Referring now to FIG. 5, a method for performing pay-per-view and video-on-demand at a local content system is set forth. In step 510, data is input regarding programs that are broadcasting or are about to be broadcasted from the external headend. The data may be obtained from the metadata associated with the program guide data. A recording or storage of content may be scheduled at the local headend through the console 56 based upon guide data. The local headend may schedule recordings for storage within the VOD content storage 360 illustrated in FIG. 3. The video file importer 344 brings content into the local system and allows an operator to assign metadata thereto. The VOD server may include the content storage 360 described above. In step 514, the content is stored in the video-on-demand file storage 360.

In step 516, the channel manager 330 is used to assign channel numbers to video-on-demand recordings to form pay-per-view channels or on-demand content channels. The new channels created to carry pay-per-view and/or on-demand content within the system 38 is stored within the channel list 352 of FIG. 3 as described above. Pay-per-view channels are prescheduled to play content at a predetermined time. On-demand content is scheduled immediately after the content is selected.

In step 518, a price delta or an incremental price increase (or decrease) may be assigned through the console 56 for the various content. The price delta is the increase in price charged by the local content distribution system above (or below) the price charged by the content provider such as DIRECTV®.

In step 520, the channel data (channel objects, metadata, etc.) for the program guide is provided to the receiving devices. The channel data may include the live content channels being received and broadcasted through the system 38 as well as the locally-inserted channels, such as local content insertion channels, video-on-demand channels and pay-per-view channels.

In step 522, the channel data is received at the user-receiving devices and displayed on a display associated with the user-receiving device. In step 524, the video-on-demand channel may be tuned or selected. In step 526, selected PPV content may be purchased from a menu display displaying video-on-demand or pay-per-view content. A selection signal is communicated to the management control system 50. In step 528, a stream of content is requested from the video-on-demand/pay-per-view server 250. In step 530, a video pump streams the program content selected. The on-demand video pump may stream on-demand content in response to the selected content. The pay-per-view video pump may also already be streaming pay-per-view content or provide pay-per-view content at a particular time. That is, more than one channel may be used to provide on-demand and pay-per-view content. In step 532, conditional access authorization may be provided to the set top or set back boxes for receiving the video-on-demand content or the pay-per-view content.

In step 534, the pay-per-view manager generates purchase data for the purchased program. This may be performed after a preview if applicable. Many content or property owners provide a five-minute content preview free of charge.

In step 536, a report of the purchase corresponding to the purchase data is provided to the property management system. In step 538, the user account associated with the receiving device is updated with the purchase data. That is, in a hotel environment the hotel room is provided a charge within the property management system.

In step 540, the pay-per-view manager 372 reports to the management control system when the guest checks out using a check-out signal. In step 542, the user is charged the cost of the content plus (or minus) the delta as described above. In step 544, the pay-per-view manager 372 illustrated in FIG. 3 communicates a request signal for a forced callback to the receiving device. That is, the receiving device such as the setback box or set top box may be forced to call back and provide data regarding pay-per-view or on-demand content. In step 546, a callback signal is generated at the receiving device and is communicated to the external headend. The call back signal includes purchase data corresponding to the selection or selections purchased at the particular receiving device. The communication may be communicated directly or through the local headend 42. In step 548, the purchase record comprising purchase data is associated with the property at the headend. In step 550, the property is billed the cost of the content. This may be performed by printing and mailing a bill or electronically generating a bill.

While particular embodiments of the disclosure have been shown and described, numerous variations and alternate embodiments will occur to those skilled in the art. Accordingly, it is intended that the disclosure be limited only in terms of the appended claims.

What is claimed is:

1. A method comprising:
    communicating content from an external headend to a local headend, said local headend coupled to a plurality of receiving devices comprising a first receiving device through a local communication network;
    storing the content in a video server of the local headend to form local content;
    at the local headend, assigning local channels of the local communication network to communicate the local content;
    at the local headend, generating local channel guide data for the local content stored at the video server in response to assigning;
    communicating the local channel guide data to the first receiving device in communication with the local headend;
    receiving a selection based on the local channel guide data from the first receiving device;
    communicating selected local content corresponding to the selection to the first receiving device through one or more of the local channels;
    storing a purchase record corresponding to the selection at the local headend;
    associating the purchase record with the first receiving device within the local headend;
    communicating a request for a callback from the local headend to the first receiving device;
    in response to the request for the callback, communicating a callback signal from the first receiving device directly to the external headend, the callback signal comprising purchase data corresponding to the purchase record for the first receiving device; and
    storing a billing record for the local headend at the external headend in response to receiving the callback signal, said billing record comprising the purchase data for the plurality of receiving devices.

2. The method as recited in claim 1 wherein prior to communicating the local channel data, storing pay-per-view content in the video server.

3. The method as recited in claim 2 wherein communicating the selected local content comprises communicating the pay-per-view content to the plurality of receiving devices using a single channel at a predetermined start time.

4. The method as recited in claim 2 wherein communicating the local channel data comprises communicating pay-per-view channel data to the first receiving device.

5. The method as recited in claim 1 wherein prior to communicating the local channel guide data, storing on-demand content in the video server.

6. The method as recited in claim 5 wherein communicating the selected local content comprises communicating the on-demand content to a single receiving device immediately after being requested.

7. The method as recited in claim 1 wherein communicating the local channel data to a receiving device comprises communicating the local channel guide data to a satellite television receiving device.

8. The method as recited in claim 1 wherein communicating the local channel guide data to a receiving device comprises communicating the local channel guide data to a set back box.

9. The method as recited in claim 8 wherein communicating the local channel guide data comprises communicating pay-per-view channel guide data to the receiving device.

10. The method as recited in claim 1 further comprising generating a checkout signal at the local headend and wherein communicating the request for the callback comprises communicating the request for the callback in response to the checkout signal.

11. The method as recited in claim 10 wherein storing the purchase record comprises:
    communicating the purchase record from a pay-per-view manager to a property management system; and
    storing the purchase record in the property management system.

12. The method as recited in claim 11 wherein communicating the request for the callback comprises communicating the request for the callback from the pay-per-view manager to the receiving device associated with the checkout signal.

13. A system comprising:
    a plurality of receiving devices comprising a first receiving device; and
    a local headend in communication with the receiving device through a local communication network having a video server therein in communication with the first receiving device and an external headend, the local headend configured to receive content from the external headend, assign local channels of the local communication network to communicate local content therethrough, store the content in the video server to form local content, generate and communicate local channel guide data for the local content stored at the video server to the first receiving device, receive a selection of the local channel guide data from the first receiving device and communicate selected local content corresponding to the selection stored in the video server to the first receiving device through one or more of the local channels;
    said local headend configured to store a purchase record corresponding to the selection, associate the purchase record with the receiving device and communicate a request for a callback to the first receiving device;

said first receiving device configured to directly communicate a callback signal to the external headend in response to the request for the callback, the callback signal comprising purchase data corresponding to the purchase record; and said external headend located remotely from the local headend storing a billing record for the local headend in response to the callback signal, said billing record comprising the purchase data for a plurality of receiving devices.

14. The system as recited in claim 13 wherein the local content comprises pay-per-view content having a predetermined start time.

15. The system as recited in claim 13 wherein the local channel data comprises pay-per-view channel data.

16. The system as recited in claim 13 wherein the local content comprises on-demand content.

17. The system as recited in claim 16 wherein the local headend streams the on-demand content to a single receiving device immediately after being requested.

18. The system as recited in claim 13 wherein the receiving device comprises a satellite television receiving device.

19. The system as recited in claim 13 wherein the receiving device comprises a setback box.

20. The system as recited in claim 19 further comprising a channel manager allocating channels to the local content in the local headend.

21. The system as recited in claim 20 wherein the local headend comprises a property management system generating a checkout signal at the local headend and the local headend communicates the request for the callback in response to the checkout signal.

22. The system as recited in claim 21 further comprising a pay-per-view manager that communicates the purchase record to the property management system, wherein said property management system stores the purchase record.

23. The system as recited in claim 22 wherein the pay-per-view manager communicates the request for the callback to the first receiving device associated with the checkout signal.

* * * * *